US006175329B1

(12) United States Patent
Vicci

(10) Patent No.: US 6,175,329 B1
(45) Date of Patent: Jan. 16, 2001

(54) AUTOMATIC EMERGENCY AND POSITION INDICATOR

(75) Inventor: Leandra Vicci, Siler City, NC (US)

(73) Assignee: University of North Carolina - Chapel Hill, Chapel Hill, NC (US)

( * ) Notice: Under 35 U.S.C. 154(b), the term of this patent shall be extended for 0 days.

(21) Appl. No.: 09/447,446

(22) Filed: Nov. 22, 1999

(51) Int. Cl.[7] ..................... H04B 7/185

(52) U.S. Cl. ..................... 342/357.09; 342/357.06; 342/357.13; 701/208; 701/213

(58) Field of Search ..................... 342/357.06, 357.07, 342/357.09, 357.13; 701/208, 211, 213

(56) References Cited

U.S. PATENT DOCUMENTS 5,587,715 * 12/1996 Lewis ..................... 342/357
5,857,155 * 1/1999 Hill et al. ..................... 455/456
6,021,371 * 2/2000 Fultz ..................... 701/200
6,037,977 * 3/2000 Peterson ..................... 348/148
6,064,336 * 5/2000 Krasner ..................... 342/357.05

* cited by examiner

*Primary Examiner*—Thomas H. Tarcza
*Assistant Examiner*—Dao L. Phan
(74) *Attorney, Agent, or Firm*—Jenkins & Wilson, P.A.

(57) ABSTRACT

An automatic emergency and position indicator includes a trigger; a global positioning system receiver for receiving a plurality of global positioning system satellite signals; a processor, responsive to the global positioning system receiver, for providing global positioning system coordinates from the received global positioning system satellite signals; a geographic information system database coupled to the processor wherein the processor, in response to the global positioning system coordinates and the database, generates a local geographic position; and a transmitter, responsive to the trigger, for transmitting to a predetermined receiving station the local geographic position.

4 Claims, 7 Drawing Sheets

AUTOMATIC EMERGENCY AND POSITION INDICATOR

TECHNICAL FIELD

The present invention relates to an emergency indicator device, and more particularly to an automatic emergency indicator that provides location information derived from the global positioning system.

BACKGROUND ART

The advent and continued growth of regional cellular networks has made it much easier to summon help from remote locations on cellular phones. However, it is not always possible to dial a cellular phone for help, be it the local 911 network, police, fire and rescue department, or ambulance service, in the event of an emergency. Moreover, some emergencies, such as assaults or severe injuries, may prevent a victim from providing accurate information relating to the nature of the emergency or the victim's location. For example, a victim may be prevented from speaking because he or she is being restrained by an assailant or because he or she has subsequently lost consciousness as a result of his or her injuries. Indeed, the victim may not even have had a chance to access his or her cellular phone.

While it is possible within a cellular network to determine a location based on the particular cell from which the incoming call is received or by triangulating through several cells, this does not provide reliable position information. The position information that can be obtained in this manner is limited to the cell from which the call originated. Since a cell may encompass a large geographic area, the exact location of a victim may not be readily discernible based only on the cell information. Moreover, locating a victim based on cells presupposes that the victim has had the time and ability to dial the telephone number and press the send button in the first place.

The global positioning system is a network of twenty four satellites which orbit the earth and act as reference points which transmit accurate position information and time signals to a receiver which are the direct measurements of the range to the respective satellites in three dimensions. The signals are processed to resolve the location of the receiver. Cellular telephones have been combined with G.P.S. receivers to provide position information over a cellular connection. Thus, it is possible to determine the location of the cellular user even without the user providing any information other than dialing and sending. However, this again presupposes the user has had the time and the ability to dial the correct number in the first place and then initiate the call by pressing send.

Indeed, where the emergency is an assault, the assailant would likely be privy to the victim's attempt to seek help by activation of the cellular phone just prior to the attack and could simply disable, destroy or discard the cellular telephone. Even if the assailant was not initially privy to the summons for help, the assailant may be alerted to such an attempt by hearing the voice on the other end when responding to the caller.

DISCLOSURE OF THE INVENTION

SUMMARY OF THE INVENTION

The invention results from the realization that a truly effective emergency and position indicator may be achieved with a G.P.S. receiver, a geographical information system database and a processor which, when the device is triggered, converts the G.P.S. signal, in cooperation with the G.I.S., into a realtime local geographic position. The local geographic position can be transmitted directly to a predetermined receiver, or voice synthesized into auditorily intelligible position information which is then transmitted.

The invention features an automatic emergency and position indicator having a trigger, a G.P.S. receiver, for receiving a plurality of G.P.S. satellite signals and a processor, responsive to the G.P.S. receiver, for providing G.P.S. coordinates from the received G.P.S. satellite signals. A geographic information system database is coupled to the processor wherein the processor, in response to the G.P.S. coordinates and the database, generates a realtime local geographic position. A transmitter, responsive to the trigger, transmits to a predetermined receiving station the local geographic position.

There may be voice synthesis means coupled to the processor and responsive to the local realtime geographic position, for generating a voice synthesized realtime local geographic position to be transmitted. The transmitter may include a telephony transmitter. There may be data input means. The data input means may include a user interface. The user interface may include a keypad. The user interface may include a microphone. There may be a receiver for receiving communications from the receiving station. The data input means may include an I/O interface. There may be display means. There may be an emergency indicator. The emergency indicator may include a predetermined voice message. The predetermined voice message may include a preprogrammed, voice synthesized message or a prerecorded voice message. There may be an interrupt for deactivating the power source. The trigger may include a dead man switch or a contact switch.

The invention also features an automatic emergency and position indicator system. There is a field unit including a trigger. A global positioning system receiver within the field unit, receives a plurality of global positioning system satellite signals. The field unit includes a processor, responsive to the global positioning system receiver, which provides global positioning system coordinates from the received global positioning system satellite signals. There is a transmitter, responsive to the trigger, for transmitting from the field unit to a predetermined receiving station the global positioning system coordinates. There is at least one receiving unit remote from the field unit. The receiving unit includes a computer and a geographic information system database coupled to the computer. The computer, in response to the transmitted global positioning system coordinates and the database, generates a local geographic position.

The receiving unit may include voice synthesis means, coupled to the computer and responsive to the local geographic position which generates a voice synthesized local geographic position.

The invention also features an automatic emergency and position indicator system having a trigger, a global positioning system receiver, responsive to the power source, for receiving a plurality of global positioning system satellite signals, a processor, responsive to the global positioning system receiver, for providing global positioning system coordinates from the received global positioning system satellite signals; and a transmitter, responsive to the trigger, for transmitting to a predetermined receiving station the global positioning system coordinates. There is a geographic information system database, remote from the transmitter and coupled to a computer wherein the computer, in response to the global positioning system coordinates and the database, generates a local geographic position. There may be voice synthesis means, remote from the transmitter, coupled to the computer and responsive to the local geographic position for generating a voice synthesized local geographic position.

Therefore, it is an object of the present invention to provide an emergency and position indicator device which automatically transmits emergency and location information to a preselected receiving station without requiring the user to communicate directly with an individual at the receiving station.

It is another object of the present invention to provide such an emergency and position indicator which provides the information which is auditorily intelligible to an individual at the receiving station.

It is another object of the present invention to provide such an emergency and position indicator which provides location information to the receiving individual based on local geographic information.

It is another object of the present invention to provide such an emergency and position indicator which does not require special equipment at the receiving end to interpret the location information.

It is still another object of the present invention to provide such an emergency and position indicator which provides updated location information if the user moves from the point where the contact was initiated.

It is still another object of the present invention to provide such an emergency and position indicator which can be covertly activated.

It is yet another object of the present invention to provide such an emergency and position indicator which is small and compact.

Having stated some of the objects of the invention hereinabove, other objects will become evident as the description proceeds when taken in connection with the accompanying drawings as best described hereinbelow.

DETAILED DESCRIPTION OF THE INVENTION

Figure 1:
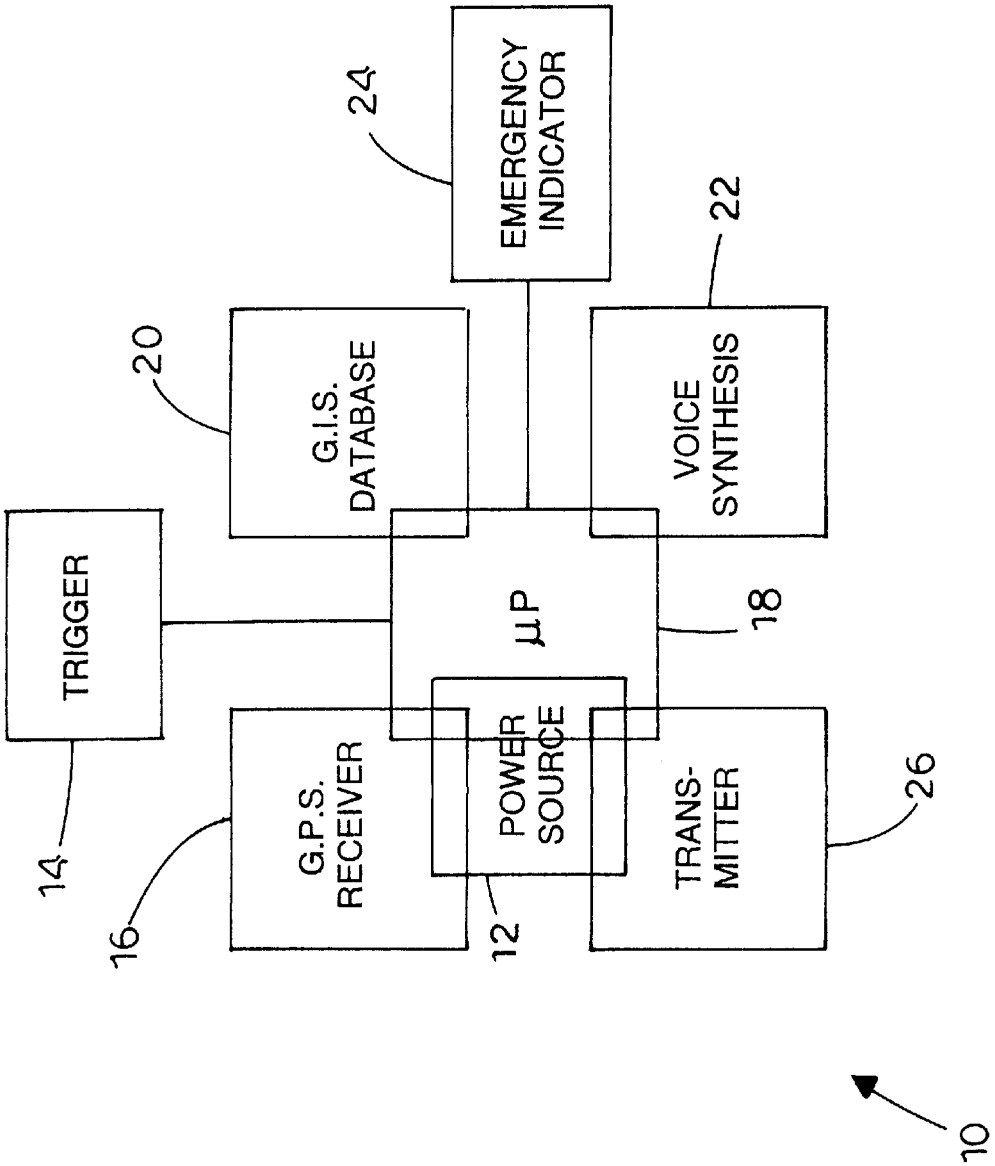
FIG. 1 is a schematic block diagram of the emergency and position indicator according to the present invention.

Referring now to FIGS. 1–6 of the drawings, emergency and position indicator 10 is provided in a field unit that generally includes a power source 12, such as a battery, and a trigger 14. Global positioning system (G.P.S.) receiver 16 receives G.P.S. signals from G.P.S. satellites (not shown). G.P.S. receiver 16 may be, for example, a 4000Si receiver available from Trimble Navigation Limited, located in Sunnyvale, Calif. G.P.S. receiver 16 may be activated by trigger 14 to receive signals or may remain powered in an active idle mode, continuously receiving signals.

Central processing unit or microprocessor 18, which may include for example a 68HC11 processor available from Motorola, Inc., converts the signals received by G.P.S. receiver 16 into position coordinates. Geographic Information System (G.I.S.) database 20, such as CARIS™ software available from Universal Systems Limited, located at Fredericton, New Brunswick, Canada, includes local geographic information for a particular geographic area. Thus, once processor 18 has converted the received signals to G.P.S. coordinates, processor 18 converts the G.P.S. coordinates to a local geographic position using G.I.S. database 20.

Once processor 18 converts the G.P.S. coordinates to the local geographic position, processor 18 may convert the local geographic position, using voice synthesis 22, to a voice synthesized local geographic position which is an auditorily intelligible representation of the current, local geographic position of device 10. While it will be understood to those skilled in the art that the auditory intelligibility will not be realized until the actual transmitted signal is received, for simplicity in terms of this discussion, once the local geographic position has been processed using voice synthesis 22, it will be referred to as a voice synthesized local position.

Emergency indicator 24 which may be, for example, a preprogrammed voice synthesized message or signal stored in a memory device, may also be provided. Alternatively, emergency indicator 24 may be a stored, prerecorded message the user inputs into device 10, for example the user's name incorporated into a preprogrammed message, or the entire message may be digitally recorded by the user.

In either case, once processor 18 has voice synthesized the local position, transmitter 26, in response to trigger 14, transmits the voice synthesized local position and emergency indicator 24 to a predetermined receiving station. However, this is not a limitation, as transmitter 26 may transmit only the local geographic position without being voice synthesized. Transmitter 26 may, for example, be a telephony transmitter such as found in a typical cellular telephone, for example a Model No. 252 available from Nokia. Transmitter 26 is programmed to automatically dial a predetermined telephone number and send the local geographic position. Transmitter 26 may come preprogrammed to dial 911 or transmitter 26 may be programmed by the user. Examples of predetermined telephone numbers that may be automatically dialed include 911, local police departments (since 911 is not found everywhere), state police departments, local fire and rescue departments as well as local park ranger services. It should be pointed out that transmitter 26 may also include an RF transmitter which transmits the voice synthesized location on a preselected frequency. While the emergency and position indicator device according to the present invention has been shown as a combination of modular components, this is not a necessary limitation of the invention as each component may be integrated into a single integrated circuit using techniques well known in the art.

Accordingly, the present invention permits a user to summon assistance and provide accurate position information to an individual at a receiving station in an auditorily intelligible manner without actually requiring the user to interact with or speak with the recipient at all. Moreover, with the present invention, the receiving station does not require any special equipment to calculate the G.P.S. coordinates or translate the coordinates to local position information. All that is required is a telephone.

Figure 2:
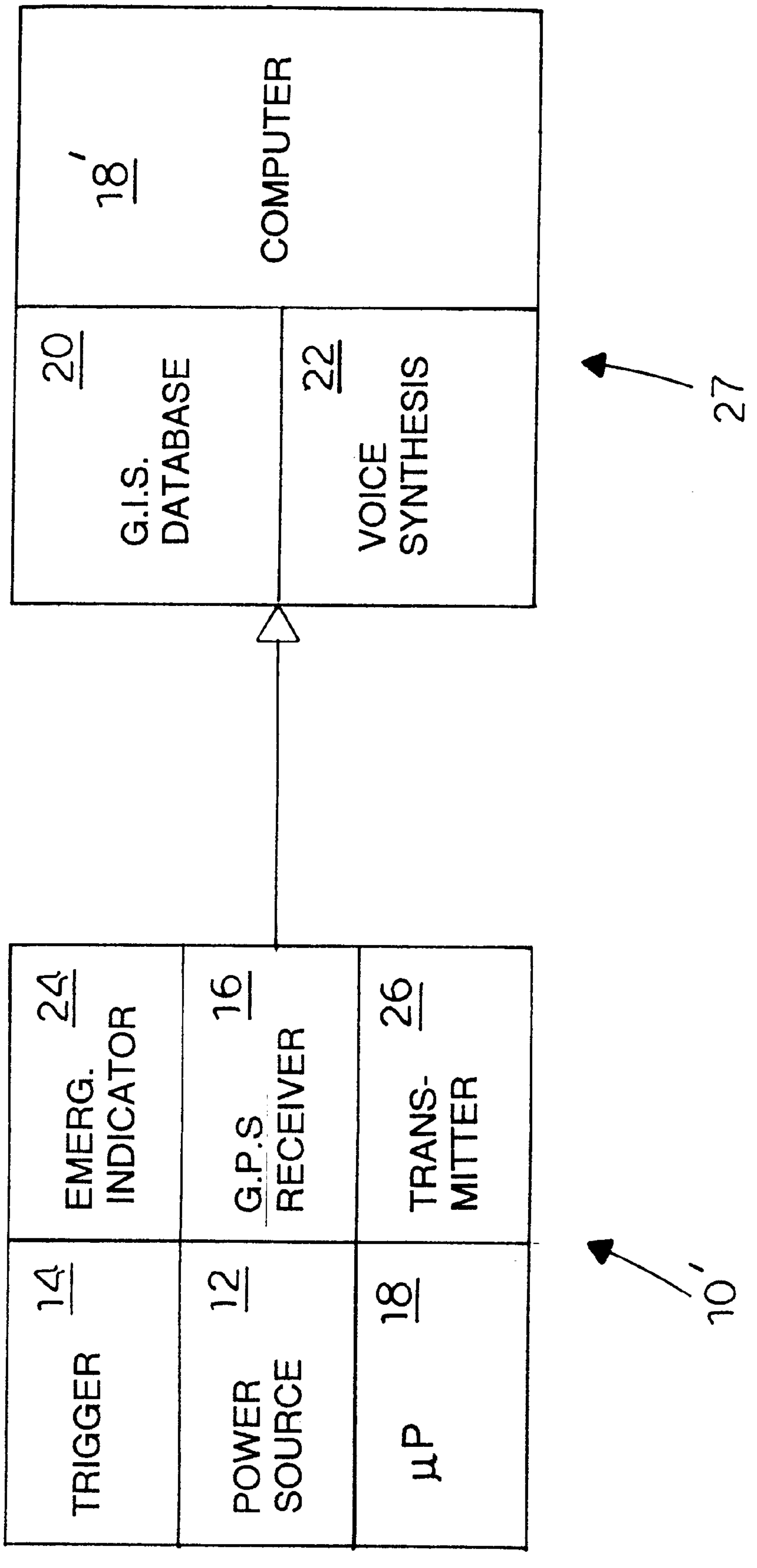
FIG. 2 is a schematic block diagram, similar to FIG. 1, in which the geographical information database and voice synthesis are remote from the emergency and position indicator.

The present invention may also embody an emergency and position indicator system 10' as shown in FIG. 2 which, in order to minimize size, includes power source 12, trigger 14, G.P.S. receiver 16, processor 18, and transmitter 26. Emergency indicator 24 may also be included. G.I.S. database 20 and voice synthesis 22 are located remote from device 10' in a receiving unit 27 which includes a computer 18', for translating the coordinates to a local position and then converting the local geographic position to a voice message. This permits device 10' to be provided in a much smaller field unit while still providing a user with the ability to convey accurate auditorily intelligible local geographic position information even if the user is unable to speak.

Receiving unit 27, including computer 18', voice synthesis means 22 and G.I.S. database 20 may, for example, be located at the designated receiving station such as the local 911 operator. However, this is not a necessary limitation of the invention as computer 18', voice synthesis means 22 and G.I.S. database 20 need not be co-located and can even be distributed among a plurality of receiving stations. For example, local geographic conversion may occur in a first receiving station which relays the converted location to a second station which provides voice synthesis. Moreover, voice synthesis may not be required. The G.I.S. local geographic position may instead be integrated into a grid map which appears on a CRT screen monitored by an operator.

When device 10' is triggered, the G.P.S. coordinates are calculated as described above with reference to FIG. 1. The G.P.S. coordinates are then transmitted to a predetermined receiving station, for example the 911 operator. When the operator receives the call the signal is processed by computer 18' which, using G.I.S. database 20, provides a local geographic position. Computer 18' in response to the local geographic position, generates a voice synthesized local geographic position, using voice synthesis means 22, which is auditorily intelligible to the 911 operator and conveys to the operator, the user's precise location in terms which readily allow authorities to come to the aid of the user. The location may be in terms of landmarks which are readily recognizable and understandable to emergency response personnel, such as road intersections, names of bridges, buildings, parks, and the like, or distances and directions from readily identifiable landmarks.

However, this is not a necessary limitation of the invention as receiving unit 27 may include a server such as a centralized monitoring station which, in response to an emergency signal, notifies the appropriate emergency authorities. Receiving unit 27 may be, for example, a home PC with modem and and software for automatically contacting a local 911. Similarly, receiving unit 27 may include a powerful mainframe with detailed G.I.S. database 20 and around the clock operators or self executing software for automatically contacting the appropriate 911 operator or emergency personnel.

For example, when field unit 10' is activated, the server validates its authorization through a security mechanism, such as an alphanumeric or digital access key, thereby gaining access to status and position information from field unit 10. The server processes the data provided by field unit 10' and establishes a telephony connection with the most appropriate emergency response center(s), typically a 911 service local to the position of the field unit. Contact is maintained between field unit 10' and receiving unit 27 until the emergency is over. The server may then telephonically return field unit 10' to idle. In this manner, field unit 10' cannot be deactivated unintentionally by the user or deliberately by an assailant.

Figure 3:
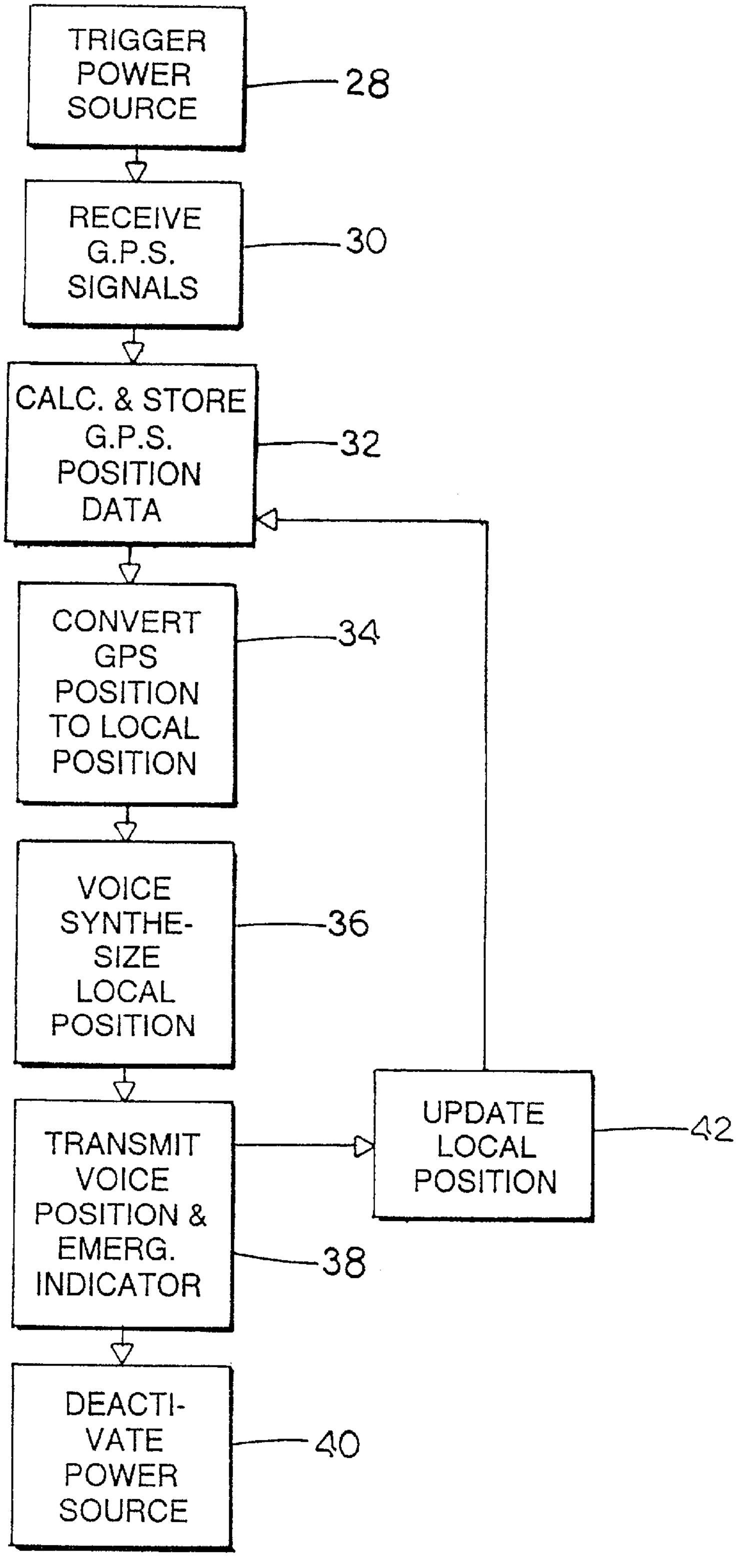
FIG. 3 is a flow chart of the operation of the emergency and position indicator of FIG. 1.

Referring now to FIG. 3, as the power source 12 is activated, through triggering or to idle mode, (Block 28), the emergency and position indicator device begins to receive signals from multiple G.P.S. satellites through G.P.S. receiver 16. As the signals are received, the G.P.S. signals are resolved into a G.P.S. coordinate position (Block 32). This position information can also be logged and stored in a memory storage device for later reference. This position is typically in terms of Universal Trans Mercator (UTM) coordinates, Ordnance Survey of Great Britain (OSGB) system coordinates, Military Grid System (MGS) coordinates or Latitude and Longitude Seconds which by themselves have little meaning. The particular format in which the G.P.S. coordinates are provided is not critical, however, since once the G.P.S. coordinates are resolved, they are translated into local geographic position information using geographical information database 20 (Block 34). For example, the G.P.S. position may be PV 83922 82686; 95m. However, using G.I.S. database 20, the local geographic position would be converted to 3100 Tower Boulevard, Durham, N.C. This may be accomplished, for example, using software which correlates any one or all of the above coordinate systems to a local position based on the G.I.S. database.

After the local geographic position has been determined, the position can be voice synthesized by voice synthesis means 22 (Block 36) using text-to-speech voice synthesis software, for example Bell Labs TTS System available from Lucent Technologies. The synthesized voice position and emergency indicator message are then transmitted by transmitter 26 (Block 38) to a predetermined receiving station. For example, where transmitter 26 (see FIG. 1) is a telephony transmitter, the voice synthesized position and emergency indicator message are sent to a predetermined telephone number such as 911. Alternatively, where transmitter 26 is a radio transmitter, the synthesized voice position and emergency indicator message are transmitted to a predetermined frequency such as an established emergency band monitored, for example, by the United States Coast Guard.

Once the power source is activated, the device preferably remains on until deactivated (Block 40). Deactivation may occur due to a drained battery, by intentionally interrupting the power source, or from a remote signal received from a server location as discussed with reference to FIG. 2. Thus, because the device remains on G.P.S. signals are continuously received and the local position may be updated (Block 42) after a predetermined period of time, for example every half second, full second, ten seconds, etc., or if a change in position is detected to provide a realtime local position. The updated position is again converted, voice synthesized and transmitted (Blocks 34, 36 and 38, respectively) over the existing connection. This may continue until the device is deactivated (Block 40). Thus, if the user is being pursued by an assailant, for example, the user's changing position is automatically updated so that a recipient of the call, such as a police dispatcher, may redirect police en route to the victim's current location.

Figure 4:
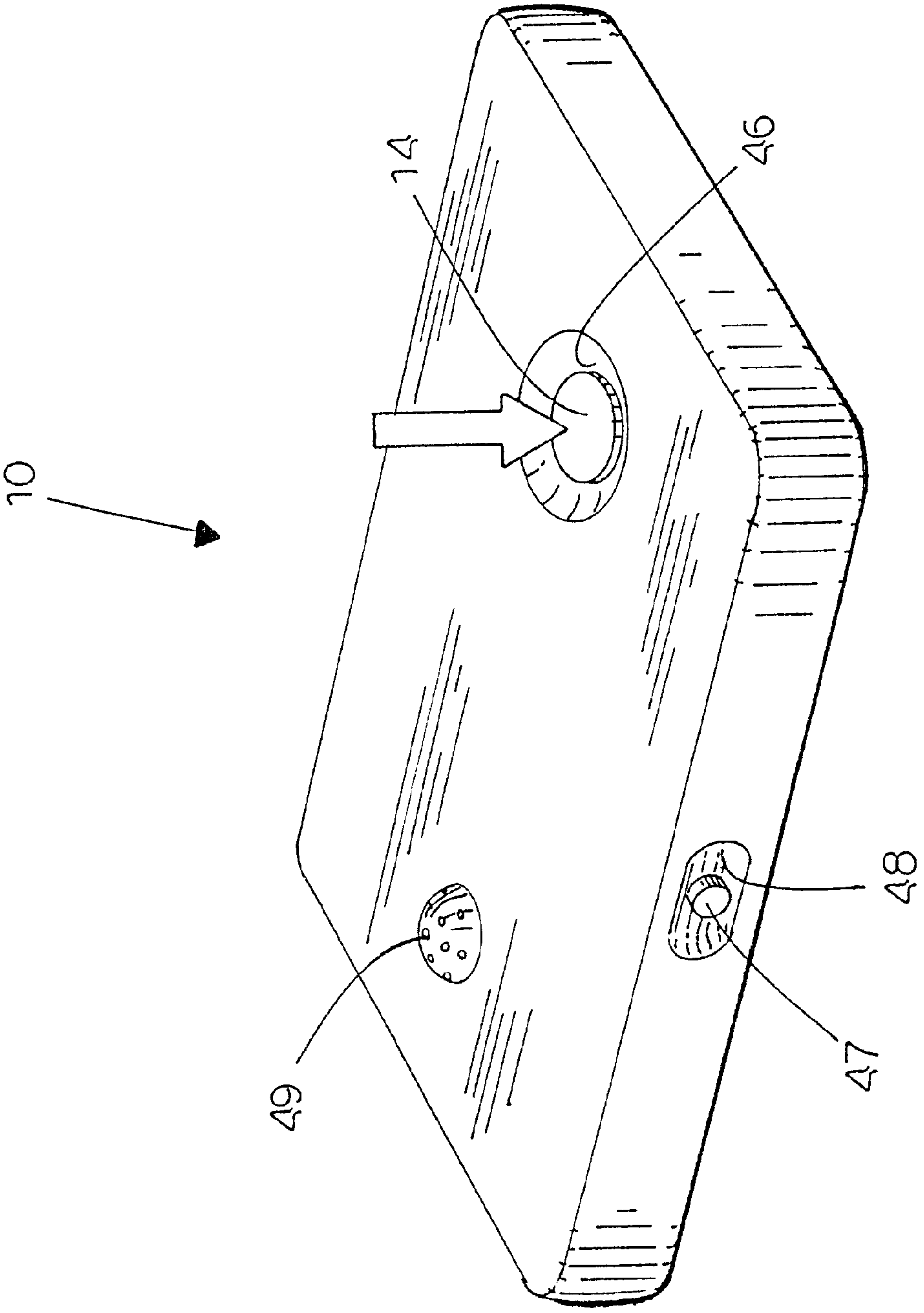
FIG. 4 is a three dimensional representation of the emergency and position indicator of the present invention in which the trigger includes a contact switch and including a microphone.

Emergency position and indicator device 10, FIG. 4, may be similar in size to a typical pager. Trigger 14 may be, for example, a contact switch which, when depressed in the direction indicated by the arrow, engages transmitter 26 to transmit the local geographic position data. (see FIG. 1). In order to prevent inadvertent activation of device 10, trigger 14 may be recessed within well 46 so that only deliberate actuation of trigger 14 will activate device 10. Moreover, to prevent inadvertent deactivation, interrupt 47, which may also be a contact switch that interrupts power source 12, may be recessed within well 48.

Microphone 49 may also be provided. Microphone 49 serves as a user interface to input data such as the user's name which may be digitally recorded and incorporated into the preprogrammed emergency indicator message discussed above. Microphone 49 may also be used to record the emergency message 24 in the user's own voice, such as, for example, "MY NAME IS JANE Q. PUBLIC AND THIS IS AN EMERGENCY. PLEASE SEND HELP. MY LOCATION IS . . . ".

Microphone 49 may also serve to convey to the receiving station the circumstances of the emergency. The user may be the victim of an assault and unable to convey the information themselves. Microphone 49 will pick up any noise within its range such as the attacker's voice, which may indirectly convey the nature of the emergency and even the number of attackers and thus the urgency in which assistance is required. Moreover, because 911 telephone calls are recorded, any voice recording of the attacker or attackers may be used to identify, apprehend and even convict the attacker(s). The user may also speak, if able, into microphone 49 directly to convey the circumstances of the emergency. In any case, microphone 49 allows the receiving station to better assess the nature of the emergency and advise the respondents, such as police, accordingly. This one-way communication also conceals the efforts of the victim to summon assistance since there is no receiver to broadcast inquiries from the receiving station to the victim which might otherwise alert an attacker who could then deactivate, disable, or discard device 10.

Figure 5:
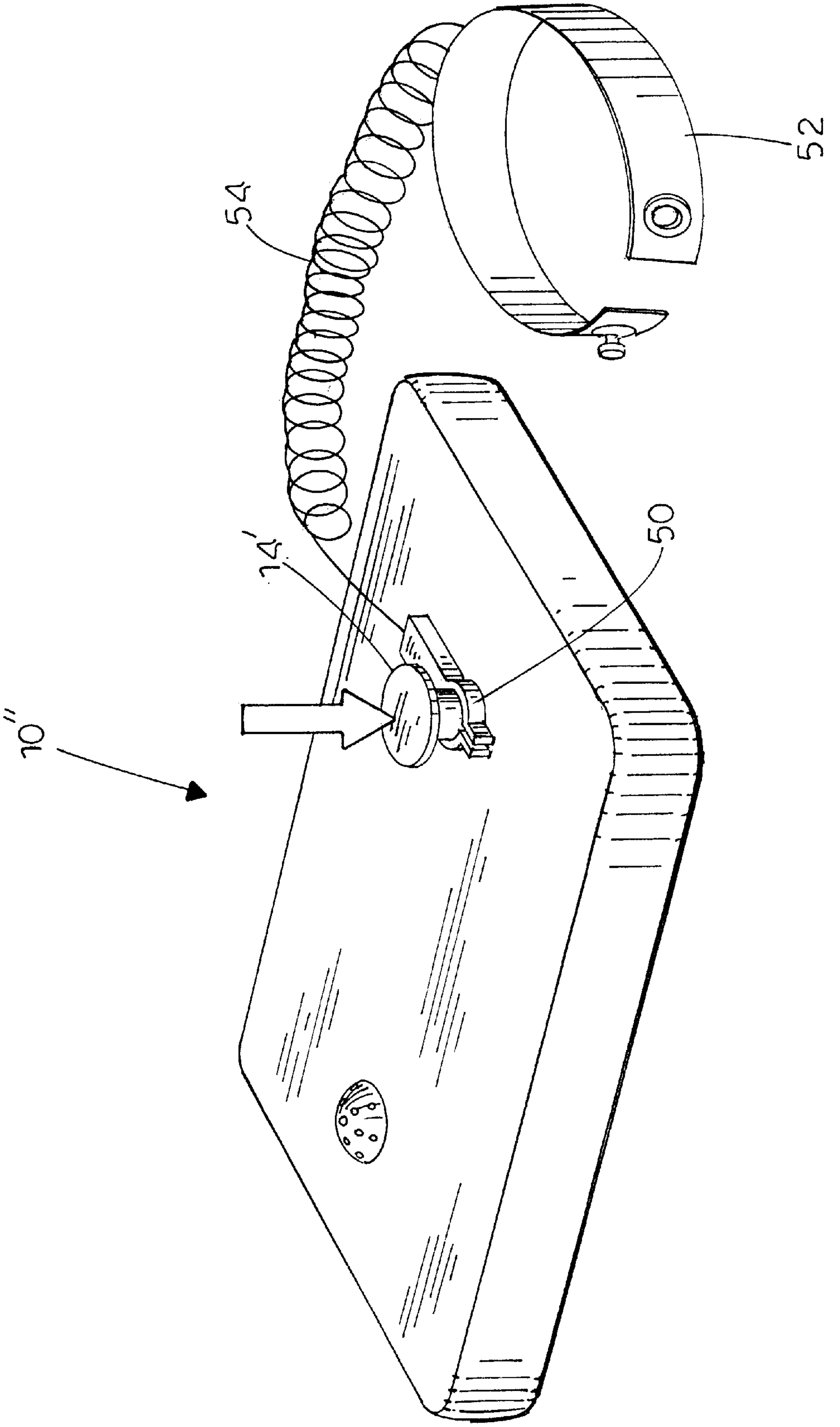
FIG. 5 is a view, similar to FIG. 4, in which the trigger includes a deadman switch.

An alternative embodiment emergency and position indicator device generally indicated as 10", FIG. 5, may include trigger 14' in the form of a "deadman" switch. Device 10" may be secured to the user while key 50 is secured to other than the user by fastener 52 and lanyard 54. However, this is for illustrative purposes and is in no way a limitation as key 50 may be secured to the user while device 10" is secured to other than the user. In any case, when key 50 is removed from device 10", trigger 14' is actuated so as to activate device 10".

As an illustration, the user may be riding a horse, bicycle, dirt bike, water craft, or the like, typically ridden in remote areas. Emergency and position indicator 10" is secured to the user while key 50 is secured to the horse or vehicle via lanyard 54 and fastener 52. If the user is thrown from the horse or vehicle, lanyard 54 causes key 50 to be extracted, or disengaged, from trigger 14' causing trigger 14' to be drawn in the direction indicated by the arrow. If after a predetermined period of time key 50 is not reinserted into trigger 14', device 10" is activated to summon help by calling home, 911, etc.

Figure 6:
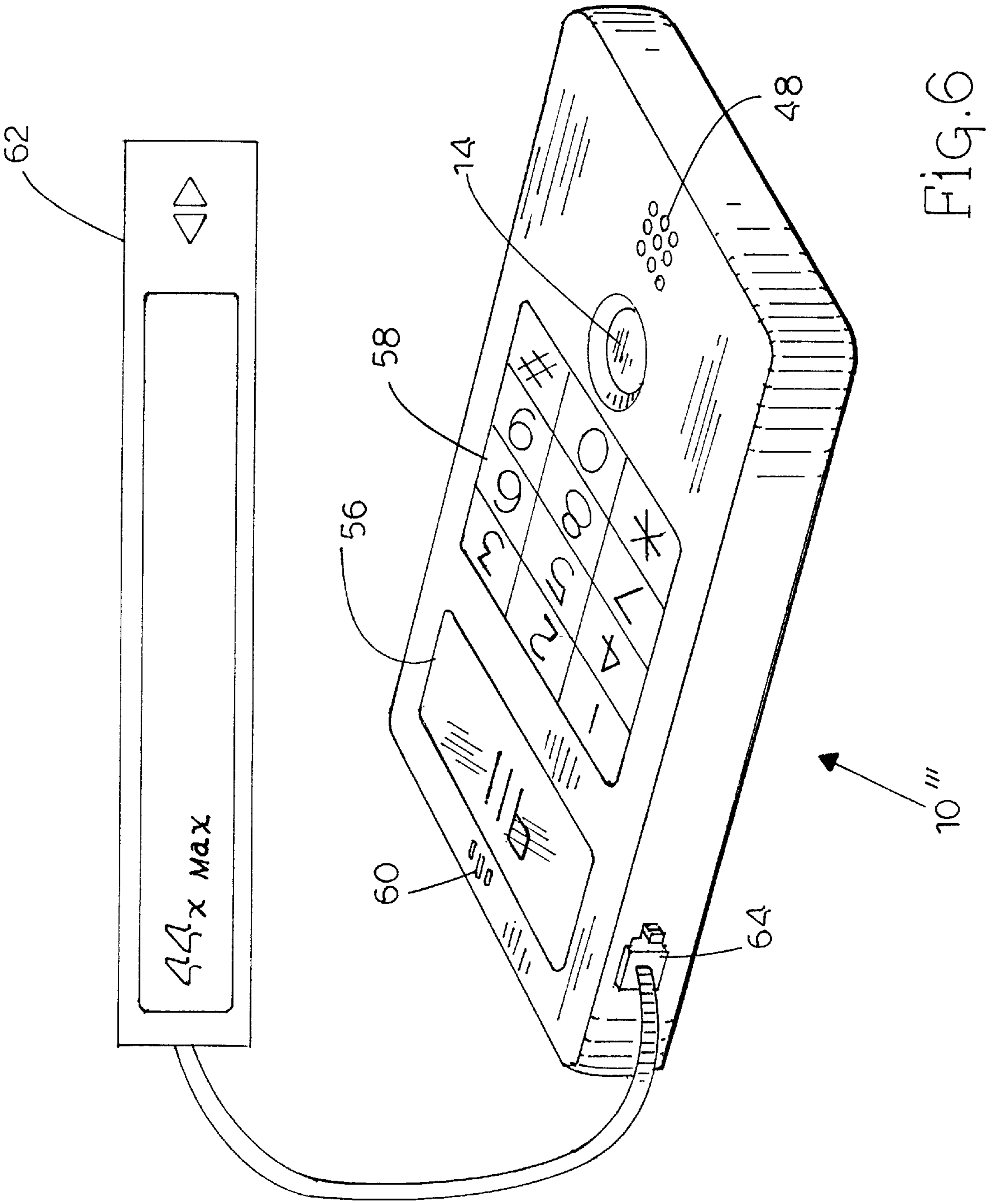
FIG. 6 is a view, similar to FIG. 5, in which the indicator includes a keypad, display and I/O interface.

Another embodiment of the emergency and position indicator is shown in FIG. 6 and generally designated 10'". Device 10'" may also include display 56 to indicate the number called as well as the calling status, e.g. sending, connected, and the like. Keypad 58 is provided as yet another user interface to allow the user to program device 10'" to call a specific number, e.g. 911, local police, state police, or local fire and rescue. Device 10'"may also be programmed to sequentially call a series of numbers until an answer is received. Thus, if 911 does not answer, or a busy signal is detected, then the local police may be called, then the state police and so on. Device 10'" may be deactivated by entering a key code, using keypad 58, to interrupt the power source.

Because device 10'" typically relies on conventional telephony to communicate emergency and position information, device 10'" may also include receiver 60 in order to provide two-way communication in the same manner as a conventional cellular telephone. However, this is not a necessary requirement of the invention as no receiver is required in order for device 10'" to provide accurate emergency and position information.

In order to provide device 10'" with a small and compact size, the components must be reduced in size as much as possible. Thus, the memory required to store G.I.S. information may be minimized by reducing the size of the G.I.S. database to only a prescribed geographic area. Accordingly, specific G.I.S. information may be downloaded for a particular area from magnetic or optical disk devices, for example, CD ROM 62 through data I/O interface 64. Thus, if the user will be traveling to a different geographic area, the G.I.S. for that area may be downloaded. Moreover, when traveling to a foreign country, not only the G.I.S. for that area may be downloaded, but the voice synthesis for the regional language may also be downloaded to provide emergency and position information in the appropriate language to ensure the local authorities understand the nature of the emergency and respond accordingly.

Figure 7:
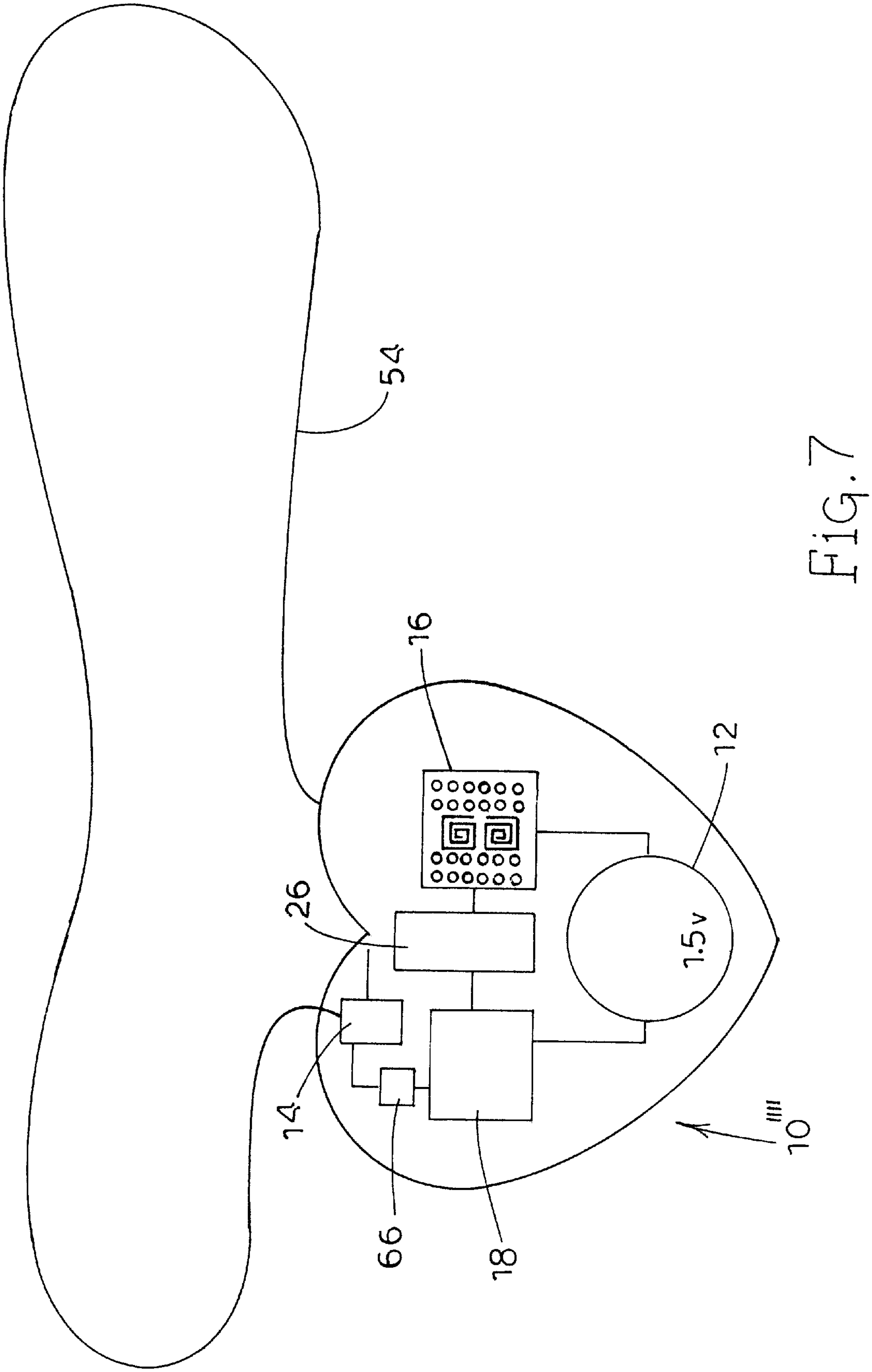
FIG. 7 is a schematic block diagram of the emergency and position indicator according to this invention in the form of a pendant.

The emergency and position indicator according to the present invention may also be embodied, for example, in a pendant 10"", FIG. 7, which includes power source 12, G.P.S. receiver 16, microprocessor 18 and transmitter 26. Trigger 14 may be activated by lanyard 54 which is placed about the user's neck. When pendant 10"" is to be activated, the user may vigorously yank the pendant, triggering transmitter 26 to send the position information. Pendant 10"" may include an accelerometer or switch 66 for placing pendant 10"" in a quiescent idle or an active idle. In the quiescent idle mode, all circuitry including G.P.S. receiver 16, microprocessor 18 and transmitter 26, are in a low-power mode, responsive only to direct triggering or trigger signals. In the active idle mode, pendant 10"" is operational, continuously receiving G.P.S. data and awaiting triggering.

Activation and deactivation signals may also be generated based on the history of the detected acceleration. Thus, as the unit is being carried by a user, changes in acceleration can be detected such that pendant 10"" is placed in active idle mode where trigger 14 activates transmitter 26 to send local geographic position information.

However, if the pendant 10"" is in idle mode and no acceleration changes are detected for a predetermined time period, e.g., 10 minutes, pendant 10"" may be placed in quiescent idle.

When pendant 10"" is activated, G.P.S. receiver 16 may continuously receive and record position information. Thus, this information may be instantly available upon triggering so that information is immediately transmitted.

Alternatively, switch 66 may be used to manually select quiescent or active idle and the user manually triggers and deactivates pendant 10"". Further, the user may only be permitted to activate pendant 10"", while deactivation is accomplished by the personnel who respond to the emergency call.

Thus, the emergency and position indicator according to the present invention provides the user with an effective method of providing emergency and position information in auditorily intelligible voice accurately without regard to the user's ability to convey any information at the time of activation. Moreover, the device according to the present invention may be implemented without the requirement of special or sophisticated equipment or maps at the receiving station and may even be modified to operate in specific geographic locations and in the appropriate language.

Although specific features of the present invention are shown in some drawings and not others, this is for convenience only as each feature may be combined with any or all of the other features in accordance with the invention. Thus, it will be understood that various details of the invention may be changed without departing from the scope of the invention. Furthermore, the foregoing description is for the purpose of illustration only, and not for the purpose of limitation—the invention being defined by the claims.

What is claimed is:

1. An automatic emergency and position indicator system comprising:

(a) a field unit, the field unit comprising:
  (i) a trigger;
  (ii) a global positioning system receiver for receiving a plurality of global positioning system satellite signals;
  (iii) a processor, responsive to the global positioning system receiver, for providing global positioning system coordinates from the received global positioning system satellite signals; and
  (iv) a transmitter, responsive to the trigger, for transmitting to a predetermined receiving station the global positioning system coordinates; and (b) at least one receiving unit, remote from the field unit, the receiving unit comprising:
  (i) a computer; and
  (ii) a geographic information system database, coupled to the computer wherein the computer, in response to the received global positioning system coordinates and the database, generates a local geographic position.

2. The system of claim 1 in which the receiving unit further includes voice synthesis means, coupled to the computer and responsive to the local geographic position, for generating a voice synthesized local geographic position.

3. The system of claim 1 wherein the field unit comprises a microphone operatively associated with the transmitter for conveying to the receiving unit circumstances of an emergency.

4. The system of claim 3 wherein the microphone is adapted to automatically receive sounds originating from or around a victim during the emergency and the transmitter is adapted to send the voice communications to the receiving unit.

* * * * *